UNITED STATES PATENT OFFICE.

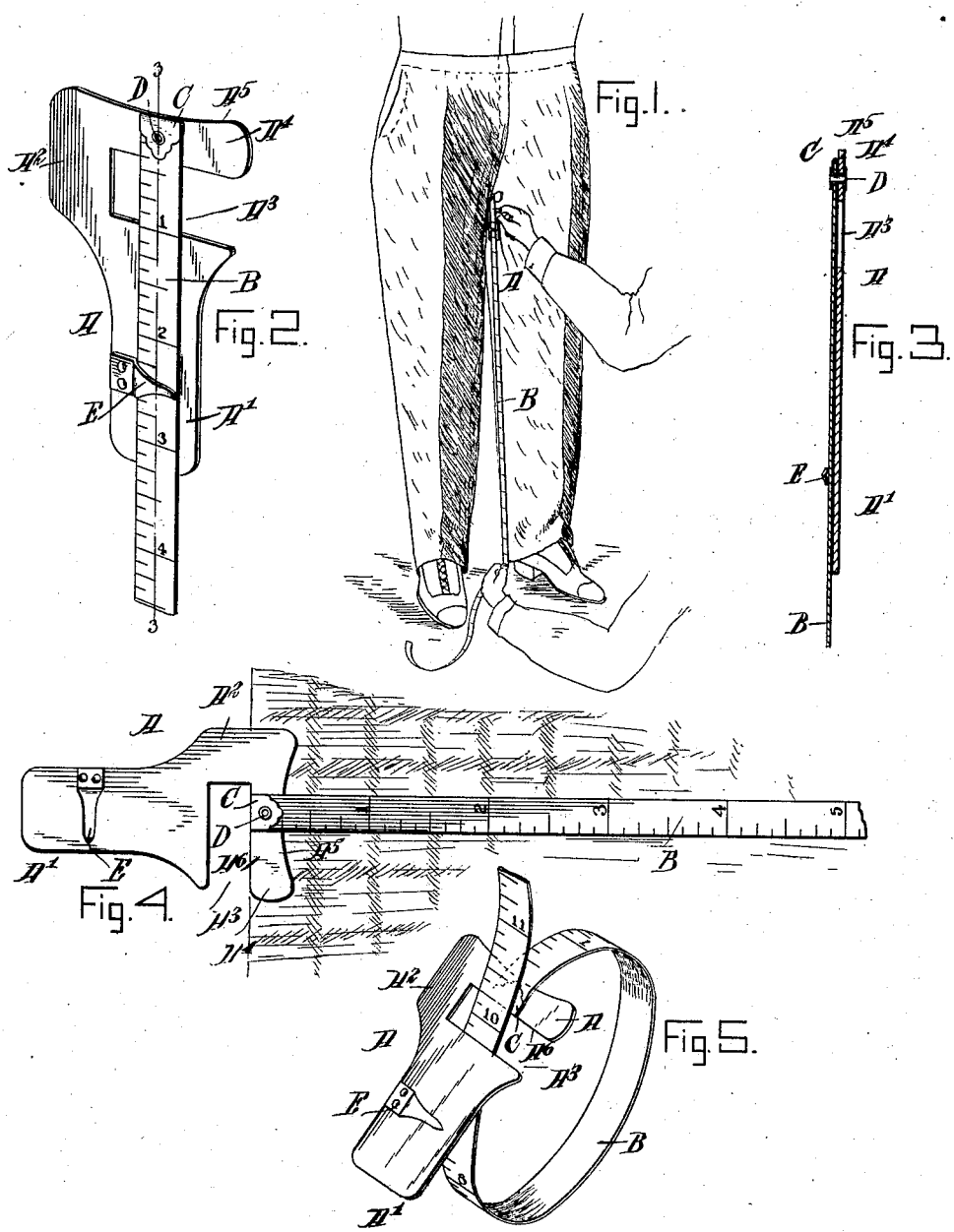

JACOB KLEIN, OF NEW YORK, N. Y.

TAPE-MEASURE.

1,011,628.      Specification of Letters Patent.      Patented Dec. 12, 1911.

Application filed February 25, 1911. Serial No. 610,669.

*To all whom it may concern:*

Be it known that I, JACOB KLEIN, a citizen of the United States, and a resident of the city of New York, borough of Manhattan, in the county and State of New York, have invented a new and Improved Tape-Measure, of which the following is a full, clear, and exact description.

The object of the invention is to provide a new and improved tape measure, more especially designed for the use of tailors and other persons for conveniently obtaining the length from the crotch to the lower end of the legs when taking the measure of a person for a pair of trousers, and to permit of readily and accurately obtaining the measure of the scye and other parts.

For the purpose mentioned, use is made of a plate having a tongue, on which is pivotally secured one end of a graduated measuring tape.

A practical embodiment of the invention is represented in the accompanying drawings forming a part of this specification, in which similar characters of reference indicate corresponding parts in all the views.

Figure 1 is a perspective view of the tape measure as applied for measuring the length of trousers' legs; Fig. 2 is a perspective view of the tape measure; Fig. 3 is a transverse section of the same on the line 3—3 of Fig. 2; Fig. 4 is a plan view of the tape measure for measuring the length of cloth and the like; and Fig. 5 is a perspective view of the tape measure for obtaining the measure of a scye and other round bodies.

A plate A, preferably of sheet metal or the like, is provided at one end with a handle A', terminating at the other end in a head $A^2$ provided with a slot $A^3$ extending from one side edge of the head $A^2$ to within a distance of the opposite side edge, as will be readily understood by the drawings, so that a tongue $A^4$ is formed on the upper end of the head $A^2$. The tongue $A^4$ has its top edge $A^5$ preferably curved, so as to accurately fit the crotch when taking the measure of a person for a pair of trousers, as indicated in Fig. 1. A measuring tape B having the usual graduation in inches and subdivisions, or other linear measure, is provided at its beginning end with a binding C, preferably of metal, and connected by a pivot D with the tongue $A^4$ of the plate A. The binding C is so arranged relative to the pivot D and the tongue $A^4$ that the outer edge of the binding C coincides with either the outer edge $A^5$ of the tongue $A^4$ or the inner edge $A^6$ thereof, as will be readily understood by reference to Figs. 2, 4 and 5. It is understood that the beginning of the graduation on the tape B coincides with the outer edge of the binding C.

When measuring for the length of a pair of trousers, the tape B is extended lengthwise of the plate A, as indicated in Figs. 1, 2 and 3, so that the terminal of the binding C coincides with the edge $A^5$ of the tongue $A^4$, and when the plate A is placed in position on the crotch then the length of the trousers' legs can be readily and accurately obtained.

A spring clip E is preferably attached to the handle A' to engage the tape B a distance from the pivotal end thereof, so as to hold the tape B properly stretched over the plate A, to permit of placing the plate A conveniently between the legs of a person without danger of the tape B being wrinkled up at the crotch portion, and consequently an accurate measurement can be obtained.

When it is desired to obtain the length of a piece of cloth or other linear measurement, then the tape B is swung around so that the terminal of the binding C coincides with the inner edge $A^6$ of the tongue $A^4$ (see Fig. 4), and the user can now readily place this inner edge $A^6$ to the beginning end of the cloth so as to obtain a correct length measure.

When measuring for a scye or other round part, the tape B is used in the same position relative to the tongue $A^4$ as when measuring for cloth or the like, as indicated in Fig. 4, and in this case the tape is passed around the shoulder, arm or other part to be measured and then through the open end of the slot $A^3$, so as to bring the tape B to the edge $A^6$ for reading off the correct measure.

From the foregoing, it will be seen that by pivotally connecting the tape B with the tongue $A^4$, accurate measurement can be obtained when measuring the length of an article or when measuring round bodies or similar parts.

Having thus described my invention, I claim as new and desire to secure by Letters Patent:

1. A tape measure, comprising a plate having a slot extending from one side edge of the plate to within a distance of the opposite edge to form a tongue on the plate, and a graduated tape pivotally connected with said tongue, the said pivotal connection being at the transverse center of the bar, and the terminal of the pivoted end of the tape being arranged to coincide with either edge of the tongue.

2. A tape measure, comprising a plate having a slot extending from one side edge of the plate to within a distance of the opposite edge to form a tongue on the plate, a graduated tape pivotally connected with the said tongue, the said pivotal connection being at the transverse center of the bar, and a spring arm on the plate for engaging the said tape a distance from its pivotal end.

In testimony whereof I have signed my name to this specification in the presence of two subscribing witnesses.

JACOB KLEIN.

Witnesses:
THEO. G. HOSTER,
PHILIP D. ROLLHAUS.

Copies of this patent may be obtained for five cents each, by addressing the "Commissioner of Patents, Washington, D. C."